United States Patent
Bamba

(10) Patent No.: US 10,438,360 B2
(45) Date of Patent: Oct. 8, 2019

(54) VIDEO PROCESSING APPARATUS, VIDEO PROCESSING METHOD, AND STORAGE MEDIUM

(71) Applicant: CANON KABUSHIKI KAISHA, Tokyo (JP)

(72) Inventor: Yasuo Bamba, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 110 days.

(21) Appl. No.: 15/596,815

(22) Filed: May 16, 2017

(65) Prior Publication Data

US 2017/0345162 A1 Nov. 30, 2017

(30) Foreign Application Priority Data

May 25, 2016 (JP) ................................. 2016-104297

(51) Int. Cl.
*G06K 9/00* (2006.01)
*G06T 7/246* (2017.01)
*G06T 7/73* (2017.01)

(52) U.S. Cl.
CPC .......... *G06T 7/248* (2017.01); *G06K 9/00718* (2013.01); *G06K 9/00744* (2013.01); *G06T 7/74* (2017.01); *G06T 2207/10016* (2013.01); *G06T 2207/10024* (2013.01); *G06T 2207/20104* (2013.01); *G06T 2207/30196* (2013.01); *G06T 2207/30232* (2013.01); *G06T 2207/30241* (2013.01)

(58) Field of Classification Search
None
See application file for complete search history.

(56) References Cited

U.S. PATENT DOCUMENTS

| 6,263,088 B1 | 7/2001 | Crabtree et al. |
| 6,687,386 B1 * | 2/2004 | Ito .................... G06K 9/00785 382/103 |
| 2008/0166045 A1 | 7/2008 | Xu et al. |

(Continued)

FOREIGN PATENT DOCUMENTS

| GB | 2542884 A | 4/2017 |
| JP | 2009-211311 A | 9/2009 |
| JP | 2012-103752 A | 5/2012 |

OTHER PUBLICATIONS

Bo Wu, et al., "CLEAR'07 Evaluation of USC Human Tracking System for Surveillance Videos", University of Southern California Institute for Robotics and Intelligent Systems, Los Angeles, CA, Multimodal Technologies for Perception of Humans, Jan. 2008.

*Primary Examiner* — Wei Wen Yang

(74) *Attorney, Agent, or Firm* — Canon U.S.A., Inc. I.P. Division

(57) ABSTRACT

A video processing apparatus is directed to appropriately associating a plurality of objects in an image. A target detection unit detects a position of a region of a tracking target included in a video image. A specific object detection unit detects a position of a specific object included in the video image. The specific object has a predetermined feature. An association unit associates the region of the tracking target with the specific object based on a relative position between the position of the region of the tracking target detected by the target detection unit and the position of the specific object detected by the specific object detection unit.

16 Claims, 5 Drawing Sheets

(56) References Cited

U.S. PATENT DOCUMENTS

2014/0184644 A1* 7/2014 Sharma .................. G06F 3/017
                                                    345/633
2016/0019700 A1* 1/2016 Maggio .................... G06T 7/20
                                                    382/103

* cited by examiner

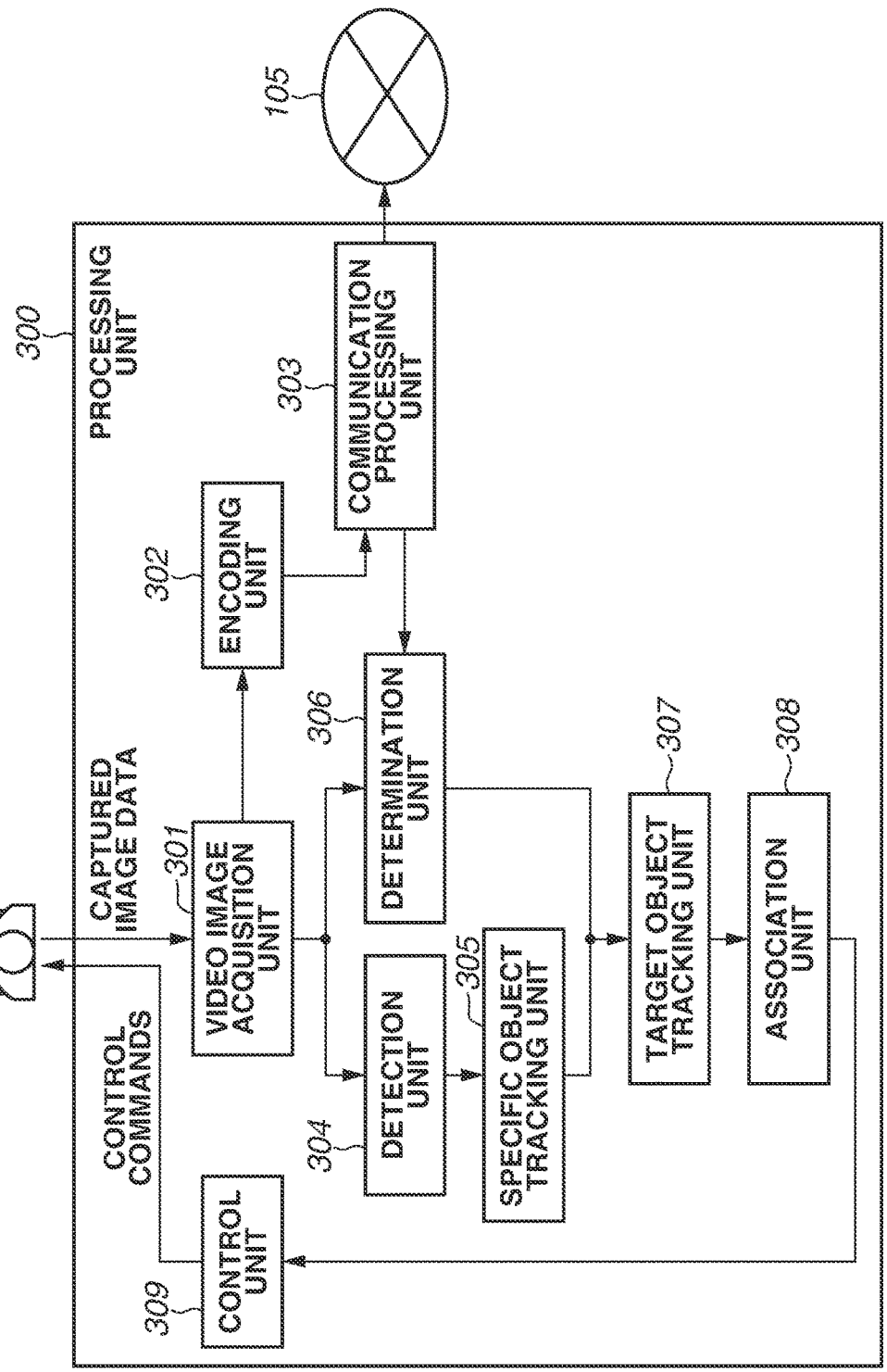

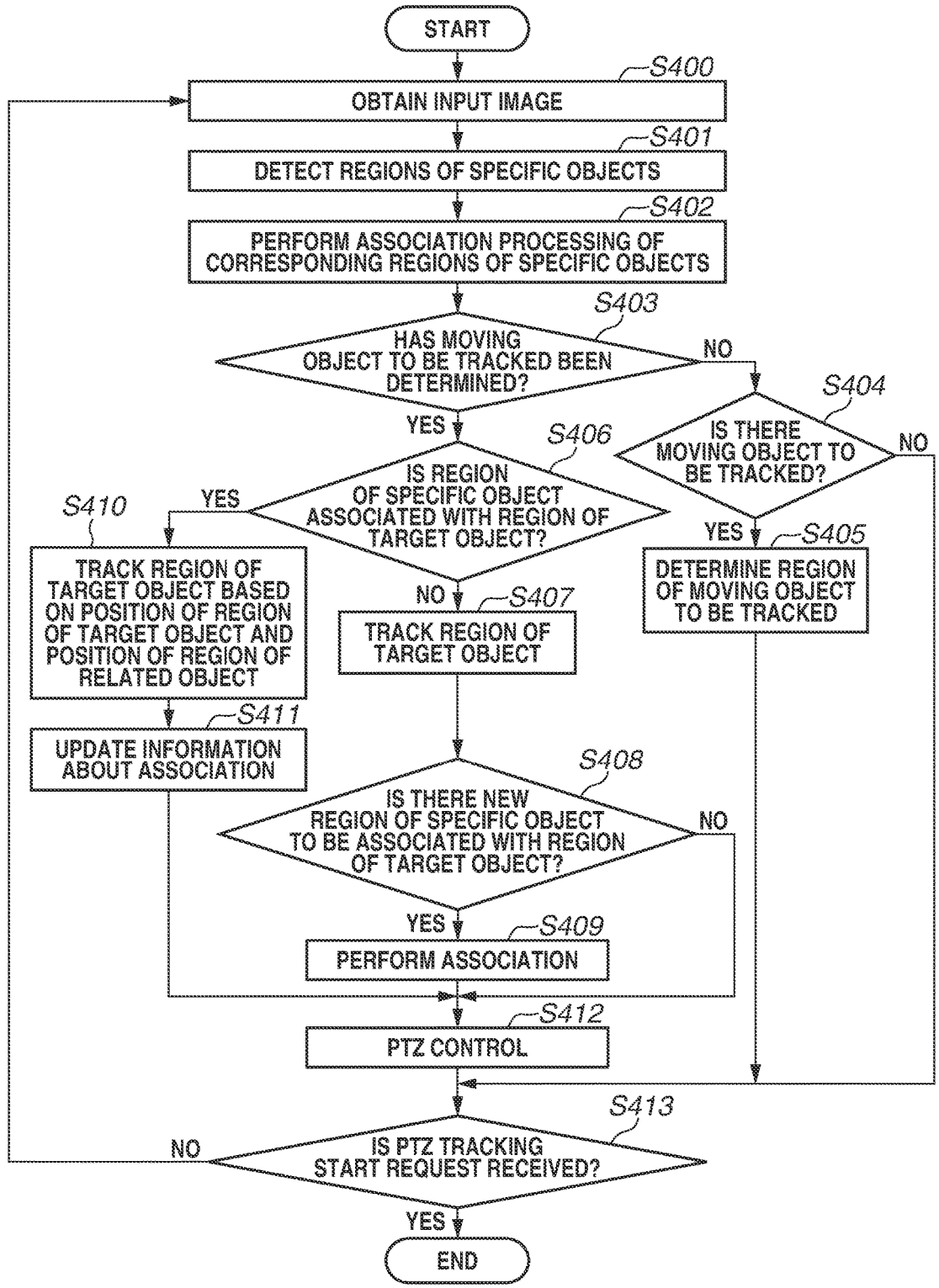

VIDEO PROCESSING APPARATUS, VIDEO PROCESSING METHOD, AND STORAGE MEDIUM

BACKGROUND OF THE INVENTION

Field of the Invention

The present invention relates to a tracking apparatus, a tracking method, and a storage medium for tracking a target in an image.

Description of the Related Art

A technique for tracking a predetermined object in a captured image of a surveillance camera has conventionally been known. There is also known a technique for managing a target object to be a tracking target and a related object, which is related to the target object, in association with each other and tracking the target object by using a tracking result of the related object. Such a technique can improve tracking accuracy of the target object. Japanese Patent Application Laid-Open No. 2012-103752 discusses a technique for determining whether a moving object corresponds to a specific object based on the area of an overlap between a region of the moving object and a region of the specific object, and if the moving object is determined to correspond to the specific object, associating the moving object with the specific object.

However, a relationship between a target object and a related object is not limited to the overlapping of image regions of the two objects. For example, if the target object is a part of a person's lower body, the head of the same person can be associated as a specific object. A technique for appropriately associating images having various relationships has thus been expected.

SUMMARY OF THE INVENTION

The present invention is directed to appropriately associating a plurality of objects in an image.

According to an aspect of the present invention, a video processing apparatus includes a target detection unit configured to detect a position of a region of a tracking target included in a video image, a specific object detection unit configured to detect a position of a specific object included in the video image, the specific object having a predetermined feature, and an association unit configured to associate the region of the tracking target with the specific object based on a relative position between the position of the region of the tracking target detected by the target detection unit and the position of the specific object detected by the specific object detection unit, wherein the target detection unit is configured to, in a case where the region of the tracking target and the specific object are associated with each other by the association unit, track the tracking target by using at least either the detected position of the region of the tracking target or the position of the specific object detected by the specific object detection unit.

Further features of the present invention will become apparent from the following description of exemplary embodiments with reference to the attached drawings.

BRIEF DESCRIPTION OF THE DRAWINGS

FIG. 3 is a diagram illustrating a software configuration of the camera.

FIG. 4 is a flowchart illustrating tracking processing by the camera.

DESCRIPTION OF THE EMBODIMENTS

An exemplary embodiment of the present invention will be described below with reference to the drawings.

Figure 1:
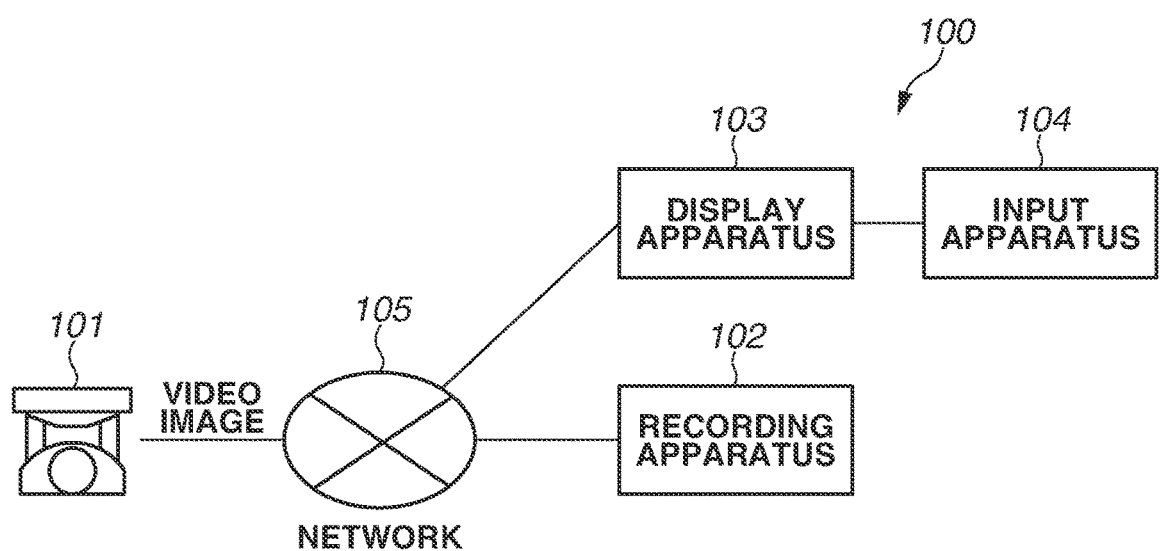
FIG. 1 is an overall diagram illustrating a tracking system.

FIG. 1 is an overall diagram illustrating a tracking system 100 according to the present exemplary embodiment. The present exemplary embodiment will be described by using a case in which the tracking system 100 tracks a person as an example. However, the tracking target is not limited to a person, and may be a vehicle, bicycle, or motorcycle. The tracking system 100 includes a camera 101, a recording apparatus 102, a display apparatus 103, and an input apparatus 104. The camera 101, the recording apparatus 103, and the display apparatus 103 are connected each other via a network 105. The input apparatus 104 is connected to the display apparatus 103. The camera 101 is one called pan-tilt-zoom (PTZ) camera, which is capable of pan, tilt, and zoom adjustments. The camera 101 automatically controls a pan, tilt, and zoom so that a target object to be a tracking target is always captured. Herein, a pan refers to horizontally changing the direction of the camera 101. A tilt refers to vertically changing the direction of the camera 101. A zoom refers to changing the angle of view to a telephotographic or wide angle side.

The camera 101 transmits a video image according to a request from the recording apparatus 102 or the display apparatus 103. The recording apparatus 102 stores the video image obtained from the camera 101 in a not-illustrated recording medium. The display apparatus 103 displays the video image obtained from the camera 101, and reads and displays the video image stored in the recording apparatus 102. The display apparatus 103 also receives a request from the user via the input apparatus 104 and transmits the request to the camera 101.

Figure 2:
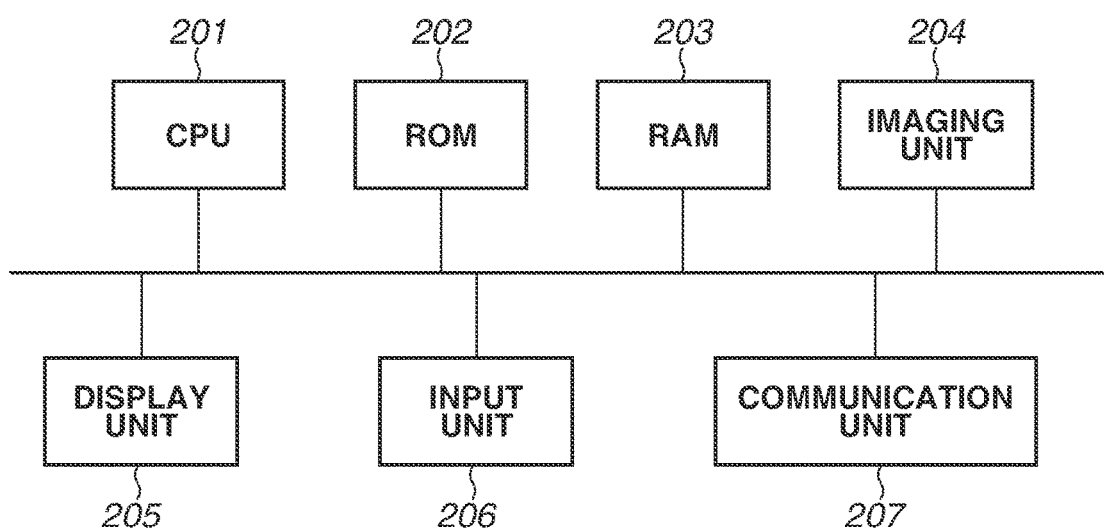
FIG. 2 is a diagram illustrating a hardware configuration of a camera.

FIG. 2 is a diagram illustrating a hardware configuration of the camera 101. A central processing unit (CPU) 201 reads a control program stored in a read-only memory (ROM) 202 and executes various types of processing. A random access memory (RAM) 203 is used as a temporary storage area, such as a main memory and a work area of the CPU 201. Functions and processing of the camera 101 to be described below are implemented by the CPU 201 reading and executing a program stored in the ROM 202. An imaging unit 204 includes a solid-state image sensor, such as a complementary metal-oxide-semiconductor (CMOS) image sensor and a charge-coupled device (CCD) image sensor, and a pan head. The imaging unit 204 changes a pan, tilt, and zoom to capture a video image (image). A display unit 205 displays various types of information. An input unit 206 includes a keyboard and a mouse, and accepts various operations by the user. A communication unit 207 performs communication processing with an external apparatus via the network 105 based on communication methods, such as the Hypertext Transfer Protocol (HTTP) and the Transmission Control Protocol/Internet Protocol (TCP/IP).

FIG. 3 is a diagram illustrating a software configuration of the camera 101. A video image acquisition unit 301 obtains captured image data from the imaging unit 204. Herein, the captured image data refers to data including a video image captured by the imaging unit 204 and orientation information (pan value, tilt value, and zoom value) about the imaging unit 204 when the video image is captured. An encoding unit 302 receives the captured image data from the video image acquisition unit 301, and encodes the video image by an appropriate coding method. Examples of the coding method include Joint Photographic Experts Group (JPEG), Moving Picture Experts Group (MPEG)-2, MPEG-4, and H.264. A communication processing unit 303 transmits the encoded video image to outside via the communication unit 207. The communication processing unit 303 transmits and receives data to/from an external apparatus. For example, the communication processing unit 303 receives information input by the user from the input apparatus 104 via the communication unit 207.

A detection unit 304 receives the video image included in the captured image data obtained by the video image acquisition unit 301. The detection unit 304 detects a region of a specific object in each frame image included in the video image by using various known techniques, such as pattern recognition and machine learning. Herein, a specific object refers to a predetermined object, such as a face, an entire human body, or part of a human body. In the present exemplary embodiment, a human face is determined as a specific object in advance. If the tracking target is an automobile, a specific object may be a vehicle's license plate.

Information needed to detect the specific object, indicating features unique to an object type of the specific object, is stored in the RAM 203 of the camera 101 in advance. For example, the detection unit 304 extracts a plurality of local patterns by using collation patterns on the entire image while changing the image in size, and calculates respective local feature amounts. The detection unit 304 then determines a specific object from the sum total of the local feature amounts with respective weights. For such processing, see Japanese Patent Application Laid-Open No. 2009-211311.

A specific object tracking unit 305 tracks the region of the specific object. Specifically, the specific object tracking unit 305 associates regions of specific objects detected in a respective plurality of frame images temporally consecutive in the video image. Such association processing can be formulated as a matching program for pairing detection results corresponding to the same specific object among the detection results of the regions of the specific objects in the frame images. The specific object tracking unit 305 initially defines a degree of similarity between the specific objects in the plurality of frame images by using an arbitrary value. Examples of the arbitrary value include a position and size of a figure representing a specific object, and a feature amount extracted from a specific object. Next, the specific object tracking unit 305 can determine matching of the detection results by using a method for pairing the detection results in descending order of the degree of similarity or a total optimization method for pairing the detection results to maximize the total sum of the degrees of similarity. The specific object tracking unit 305 then assigns the same identifiers (IDs) to the associated regions of the specific objects.

A determination unit 306 receives the video image included in the captured image data obtained by the video image acquisition unit 301. The determination unit 306 then determines a moving object in the video image to be a tracking target. The moving object that is a tracking target will hereinafter be referred to as a target object. A target object tracking unit 307 tracks the region of the target object based on the position of the region of the target object and the position of the region of the specific object associated with the region of the target object. An association unit 308 associates the region of the target object determined by the determination unit 306 with the region of the specific object detected by the detection unit 304. Details of processing of the determination unit 306, the target object tracking unit 307, and the association unit 308 will be described below. A control unit 309 generates and issues control commands for a pan motor, a tilt motor, and a zoom motor of the camera 101.

FIG. 4 is a flowchart illustrating tracking processing by the camera 101. For example, if the communication processing unit 303 receives a PTZ tracking start request transmitted to the camera 101 according to a user input to the input apparatus 104, the CPU 201 of the camera 101 starts a PTZ tracking mode. The tracking processing is the processing of the camera 101 in the PTZ tracking mode. FIGS. 5A to 5D are explanatory diagrams of the tracking processing. Frame images 500, 510, 520, and 530 illustrated in FIGS. 5A to 5D are consecutive frame images included in a video image. The frame images 500, 510, 520, and 530 are arranged in order corresponding to the order of capturing. In other words, the frame images 500, 510, 520, and 530 are an example of a plurality of images obtained in a time series. Coordinates illustrated to the right of the frame images in FIGS. 5A to 5D will be described below.

In step S400 of FIG. 4, the video image acquisition unit 301 obtains a frame image (input image) captured by the imaging unit 204. The frame image obtained in step S400 is subjected to the processing of step S401 and subsequent steps. The frame image to be processed will hereinafter be referred to as a target frame image. The tracking processing is loop processing. For example, if the video image including the four frame images illustrated in FIGS. 5A to 5D is to be processed, the video image acquisition unit 301 obtains the frame image 500 when step S401 is executed for the first time. The video image acquisition unit 301 obtains the frame image 510 when step S401 is executed for the second time. In such a manner, the video image acquisition unit 301 obtains frame images one by one in the order of arrangement (order of capturing) in the video image.

In step S401, the detection unit 304 detects regions of specific objects from the target frame image by using various techniques including known pattern recognition and machine learning techniques. In the present exemplary embodiment, the detection unit 304 detects the regions of the specific objects with a human head as a specific object. In the example of FIGS. 5A to 5D, the frame image 500 of FIG. 5A includes no specific object, and no region of a specific object is detected. Regions 512 and 513 of specific objects are detected from the frame image 510 of FIG. 5B. Regions 522 and 523 of specific objects are detected from the frame image 520 of FIG. 5C. Regions 532 and 533 of specific objects are detected from the frame image 530 of FIG. 5D.

Figure 5A:
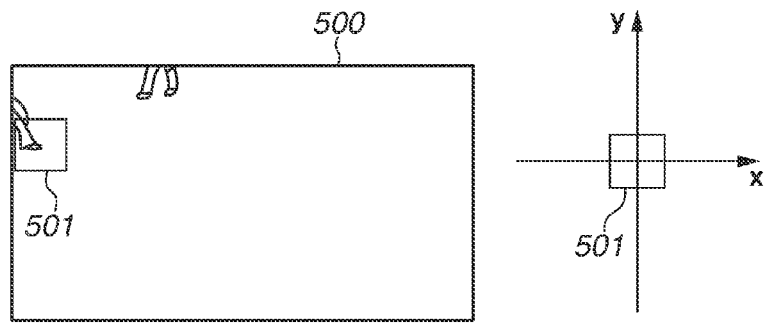
FIGS. 5A, 5B, 5C, and 5D are explanatory diagrams of the tracking processing.
Figure 5B:
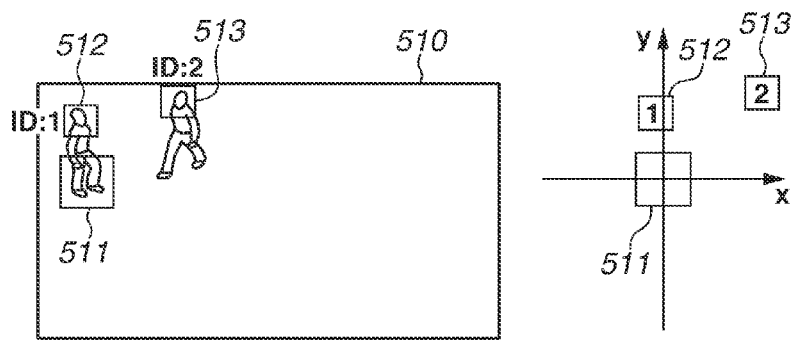

In step S402, the specific object tracking unit 305 performs the association processing of corresponding regions of specific objects between the temporally consecutive frame images. Suppose, in the example of FIGS. 5A to 5D, that the frame image 510 of FIG. 5B is the target frame image. In such a case, the immediately previous frame image 500 does not include regions of specific objects corresponding to the regions 512 and 513 of the specific objects. The specific object tracking unit 305 therefore assigns new specific object IDs to the regions 512 and 513 of the specific objects. In the example of FIG. 5B, a specific object ID "1" is assigned to the region 512 of the specific object. A specific object ID "2" is assigned to the region 513 of the specific object.

Figure 5C:
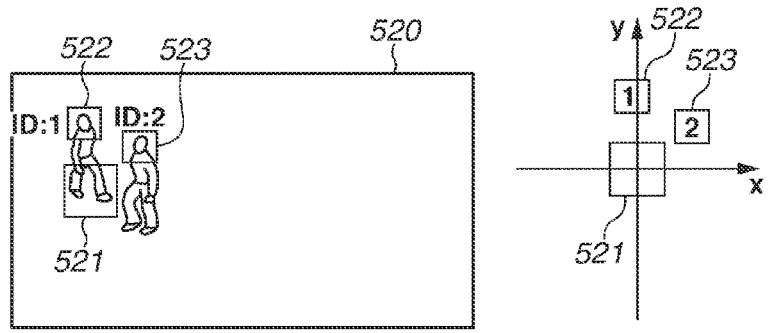

Suppose that the frame image 520 of FIG. 5C is the target frame image. In such a case, the immediately previous frame image 510 includes the regions 512 and 513 of the specific objects. The specific object tracking unit 305 therefore assigns the same specific object IDs as those of the regions 512 and 513 of the specific objects in the frame image 510, i.e., "1" and "2", to the respective corresponding regions 522 and 523 of the specific objects in the frame image 520. In such a manner, the same specific object IDs are assigned to the regions related to the same specific objects so that the regions of the specific objects can be associated with each other. Similarly, the specific object IDs "1" and "2" are assigned to the regions 532 and 533 of the specific objects of FIG. 5D, respectively.

Return to FIG. 4. After the processing of step S402, the processing proceeds to step S403. In step S403, the CPU 201 determines whether a moving object to be tracked has already been determined. If a moving object to be tracked has been determined (YES in step S403), the processing proceeds to S406. If a moving object to be tracked has not been determined (NO in step S403), the processing proceeds to step S404. For example, immediately after the PTZ tracking mode is started, the processing proceeds to step S404 since no moving object to be tracked has been determined.

In step S404, the determination unit 306 determines whether there is a moving object to be tracked in the target frame image. If there is a moving object to be tracked in the target frame image (YES in step S404), the processing proceeds to step S405. In step S405, the determination unit 306 determines a region of the moving object to be tracked as a region of a target object. Specifically, the determination unit 306 automatically detects a moving object. For example, the determination unit 306 detects moving regions by using a technique for determining a difference between temporally adjoining frame images, called an interframe difference. The determination unit 306 then detects a rectangular region including many moving regions as the region of the target object. In the example of FIGS. 5A to 5D, as illustrated in FIG. 5A, a person's foot initially appears in the frame image. A rectangular region 501 including the person's foot is thus determined to be the region of the target object. If there is no moving object to be tracked in the target frame image (NO in step S404), the processing proceeds to step S413.

In another example, the user may want to explicitly specify a moving object through the input apparatus 104. In such a case, the determination unit 306 may determine that there is a moving object to be tracked. If the user clicks a mouse, which is an example of the input apparatus 104, near the object that the user wants to track, the determination unit 306 obtains information about the clicking via the communication processing unit 303. The determination unit 306 then determines that there is a moving object to be tracked. Based on the information, the determination unit 306 determines, for example, a rectangular region of certain size around the clicked coordinates as the region of the target object.

In step S406, the CPU 201 determines whether a region of a specific object is associated with the region of the target object. If there is information associating the region of the target object with a region of a specific object (YES in step S406), the processing proceeds to step S410. If there is no information associating the region of the target object with a region of a specific object (NO in step S406), the processing proceeds to step S407.

Figure 5D:
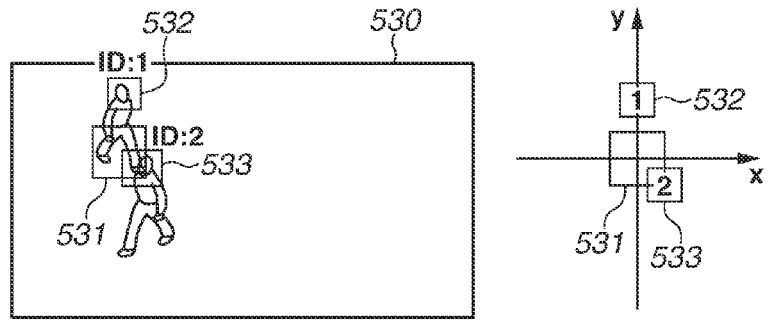

In step S407, the target object tracking unit 307 tracks the region of the target object in the target frame image. Specifically, the target object tracking unit 307 detects the region of the target object having been determined in the processing up to the previous frame image of the target frame image, and identifies the detected position. The target object tracking unit 307 may detect the region of the target object by using an arbitrary tracking technique. Examples of the tracking technique include template matching and mean shift. In the example of FIGS. 5A to 5D, a region 511 in the frame image 510 of FIG. 5B is detected as the region of the target object by the tracking processing on the region 501 of the target object in the frame image 500 of FIG. 5A. The target object tracking unit 307 identifies the position of the region 511. Similarly, a region 521 in the frame image 520 of FIG. 5C and a region 531 in the frame image 530 of FIG. 5D are detected as the region of the target object. The target object tracking unit 307 identifies the positions of the regions 521 and 531.

In step S408, the association unit 308 determines whether there is a new region of a specific object to be associated with the region of the target region. The association unit 308 here refers to the position of the target object obtained as a result of the tracking processing of the target object and the positions of the specific objects obtained as a result of the tracking processing of the specific objects. The processing of step S408 will now be described with reference to FIGS. 5A to 5D. The coordinate systems illustrated to the right of the frame images 510 to 530 in FIGS. 5A to 5D are orthogonal coordinate systems with the center of the target object as the origin. In such orthogonal coordinate systems, the horizontal direction of the frame image is represented by an x-axis (with the rightward direction as positive). The vertical direction is represented by a y-axis (with the upward direction as positive). The center of the region of the target object is the origin. Such orthogonal coordinate systems can digitize a relative position between regions of specific objects. Between vertical and horizontal widths of the region of the target object, a greater one is defined to have a length of 1.0. In FIGS. 5A to 5D, the numerals illustrated in the boxes corresponding to the regions 512, 513, 522, 523, 532, and 533 of the specific objects in the coordinate systems indicate the specific object IDs.

The association unit 308 determines whether to associate the region of the target object with a region of a specific object according to an association condition concerning a positional relationship between the region of the target object and the region of the specific object. The association condition is set in a storage unit, such as the RAM 203 in advance. In the present exemplary embodiment, the association condition includes two conditions described below. If a region of a specific object satisfies both the conditions, the association unit 308 determines to associate the region of the specific object with the region of the target object.

The first condition is that a distance between the region of the target object and the region of the specific object remains less than a distance threshold during a determination period. The second condition is that a maximum value of the amount of change in relative position (hereinafter, maximum positional change amount) of the region of the specific object with reference to the position of the region of the target object during the determination period is less than a change amount threshold. The determination period may be defined by the number of frames or by elapsed time. The determination period may be a continuous period, or periods occupying a predetermined proportion of a continuous period. For example, the predetermined period may be "five consecutive frames" or "four or more frames in five consecutive frames". In the following description, the determination period is assumed to be three consecutive frames.

The first condition will be described further. For example, the distance between the region of the target object and a region of a specific object can be defined by a Euclidean distance between the center coordinates of the respective regions. Only regions of specific objects of which the distance is less than or equal to a certain value, for example, less than or equal to 2.5 are determined to satisfy the first condition. Suppose that the regions 512, 513, 522, 523, 532, and 533 of the specific objects each have a distance of 2.5 or less from the region of the target object. In such a case, all the regions 512, 513, 522, 523, 532, and 533 of the specific objects satisfy the first condition.

The second condition will be described further. The relative position of a region of a specific object with reference to the position of the region of the target object is defined by the x and y coordinates of the center point of the region of the specific object in the foregoing orthogonal coordinate system. Suppose that the specific objects, in the regions 512, 522, and 532, having the specific object ID "1" have x and y coordinates of (−0.1, 1.2), (−0.1, 1.3), and (0, 1.1), respectively. Suppose also that the specific objects, in the regions 513, 523, and 533, having the specific object ID "2" have x and y coordinates of (1.8, 1.6), (1.0, 0.8), and (0.4, −0.4), respectively. In such a case, for example, the maximum positional change amount can be defined as a maximum value of the Euclidean distance between two of the regions of the specific objects having the same specific object ID, appearing during the determination period.

For example, the maximum positional change amount between the regions of the specific objects having the specific object ID "1" in the frame images 510, 520, and 530 of FIGS. 5B, 5C, and 5D is a Euclidean distance of 0.22 between the region 522 of the specific object and the region 532 of the specific object. Similarly, the maximum positional change amount between the regions of the specific objects having the specific object ID "2" in the frame images 510, 520, and 530 in FIGS. 5B, 5C, and 5D is a Euclidean distance of 1.84 between the region 513 of the specific object and the region 533 of the specific object. Suppose, for example, that only regions of specific objects having a maximum positional change amount less than or equal to 0.7 satisfy the second condition. The regions of the specific objects having the specific object ID "1" then satisfy the second condition. The regions of the specific objects having the specific object ID "2" do not satisfy the second condition.

Consequently, if the frame image 530 of FIG. 5D is set as the target frame image, the region 532 of the specific object having the specific object ID "1" is determined to be associated with the region of the target object. The region 533 of the specific object having the specific object ID "2" is determined not to be associated with the region of the target object.

In such a manner, the association unit 308 can appropriately associate the region of the target object with a region of a specific object by referring to the condition concerning the positional relationship between the region of the target object and the region of the specific object. The association unit 308 can appropriately determine whether to associate a region of a specific object with the region of the target object even if the region of the specific object and the region of the target object do not always overlap each other. The processing of step S408 is an example of the determination processing for determining whether to associate an object region of a specific object with an object region of a target object.

Return to FIG. 4. In step S408, if the association unit 308 determines that there is a new region of a specific object to be associated with the region of the target object (YES in step S408), the processing proceeds to step S409. If the association unit 308 determines that there is no new region of a specific object to be associated (NO in step S408), the processing proceeds to step S412.

In step S409, the association unit 308 associates the region of the specific object determined to be associated in step S408 with the region of the target object. For example, the association unit 308 generates association information associating the region of the target object with the specific object ID of the region of the specific object, and stores the association information into the RAM 203. In the frame image 530 of FIG. 5D, the region 531 of the target object is associated with the region 532 of the specific object having the specific object ID "1". A region of a specific object associated with the region of the target object will hereinafter be referred to as a region of a related object.

In step S410, the target object tracking unit 307 tracks the region of the target object based on the position of the region of the target object and that of the region of the related object. An arbitrary method may be used for the tracking processing. A first method is a method for tracking the region of the target object based on the position of the region of the related object. The target object tracking unit 307 identifies the region of the specific object having the same specific object ID as that of the related object based on the result of tracking in step S402, and updates the position of the region of the related object. The target object tracking unit 307 can determine the position of the region of the target object from that of the region of the related object by assuming that the positional relationship between the region of the target object and the region of the related object when the region of the target object is associated with the region of the related object is unchanged.

A second method is a method for tracking the region of the target object based on both the position of the region of the target object and the position of the region of the related object. The target object tracking unit 307 here tracks the region of the target object by processing similar to that of step S407. The target object tracking unit 307 also tracks the region of the related object by processing similar to that described for the first method. The target object tracking unit 307 then integrates the two tracking results to determine the position of the region of the target object. Specifically, the target object tracking unit 307 may determine the position of the region of the target object by adopting one having a higher degree of confidence about tracking between the tracking results. The target object tracking unit 307 may calculate, as the position of the target object, an intermediate value between the positions of the target object determined from the respective tracking results. As employed herein, the degree of confidence of tracking refers to a score indicating a success probability of the tracking.

If the degree of confidence of tracking calculated in step S410 is less than or equal to a threshold, the target object tracking unit 307 restores the moving object to be tracked to an undetermined state. In step S407, the target object tracking unit 307 similarly calculates a degree of confidence of tracking. If the calculated degree of confidence of tracking is less than or equal to a threshold, the target object tracking unit 307 restores the moving object to be tracked to an undetermined state.

In step S411, the association unit 308 updates the information (association information) about the association between the region of the target object and the region of the specific object. For example, if the region of the related object disappears from a plurality of consecutive frame images, the association unit 308 cancels the association between the region of the target object and the region of the specific object serving as the region of the related object. Specifically, the association unit 308 deletes the specific object ID of the region of the specific object serving as the region of the related object that is associated with the region of the target object from the association information.

In step S412, the control unit 309 controls the pan, tilt, and zoom of the camera 101 based on the position of the region of the target object determined in step S407 or S411 so that the target object is displayed near the center of the image. Specifically, the control unit 309 generates control commands for the pan motor, the tilt motor, and the zoom motor, and transmits the control commands to the imaging unit 204.

In step S412, if there is a region of a related object, the control unit 309 may control the pan, tilt, and zoom of the camera 101 based on the position of the related object so that the target image continues to be displayed near the center of the image. In the present exemplary embodiment, the control unit 309 is described to control all the pan, tilt, and zoom. However, the control unit 309 may control at least one of the pan, tilt, and zoom. This processing is an example of control processing for controlling at least either the imaging direction or the imaging angle of view based on the position of the object region serving as the related object.

In another example, if there is a region of a related object, the position and size of the region of the target object can be estimated based on the position and size of the region of the related object. The control unit 309 may then control the zoom of the camera 101 based on the estimation result, for example, so that the target object has a constant size in the image.

In step S413, the CPU 201 checks whether the communication processing unit 303 has received a PTZ tracking start request transmitted according to a user input to the input apparatus 104. If the PTZ tracking start request is received (YES in step S413), the tracking processing ends. If the PTZ tracking start request is not received (NO in step S413), the processing proceeds to step S400.

As described above, the tracking system according to the present exemplary embodiment can automatically associate the region of the target object with a region of an appropriate object. The region of the target object can be associated even with a region of an object that does not overlap the region of the target object in an image. Even if there is a plurality of regions of specific objects that can be associated with the region of the target object on the image, a region of an appropriate specific object can be selected and associated with the region of the target object. In such a manner, a plurality of regions of objects in an image can be appropriately associated.

In PTZ tracking, the region of the target object and a region of a specific region are associated with each other so that the tracking accuracy is improved. The region of the target object is tracked by using appearance information, such as color and edges extracted from an image. Such tracking is likely to fail if there are factors, for example, a change in the appearance of the target object and variations of illumination. Instead of the region of the target object, a region of a specific object associated with the region of the target object is tracked, and the region of the target object and the region of the related object are simultaneously tracked, and then, the results are integrated so that more accurate tracking can be performed.

Also, the region of the target object and a region of a specific object are associated with each other so that appropriate PTZ control can be performed. The position and size of the region of the target object can be estimated from the position and size of the region of the related object on the screen. Based on the estimation result, for example, the zoom can be controlled so that the target object is displayed in a constant size on the screen. The pan and tilt can be controlled so that an important part of the target object is displayed at the center of the screen.

In a first modification of the present exemplary embodiment, the association unit 308 may determine (change) the association condition according to the number of regions of specific objects that appear in the video image. For example, the greater the number of regions of specific objects to appear, the longer the determination period the association unit 308 may make. Such processing is an example of period change processing for changing the determination period. The association unit 308 may change the first and second conditions so that the greater the number of regions of specific objects that appear, the less likely regions of specific objects are to be associated with the region of the target object. Such a change enables the association of only a region of a specific object more highly relevant to the region of the target object with the region of the target object if there is a plurality of regions of specific objects that is likely to be associated with the region of the target object.

In a second modification, the association unit 308 may change as appropriate the determination period of the association condition described in the exemplary embodiment. For example, the association unit 308 may change the determination period based on the distance between the region of the target object and the region of the specific object or based on the area of an overlap between the region of the target object and the region of the specific object. For example, if the distance between the region of the target object and the region of the specific object is less than a threshold, the association unit 308 may set the determination period at a period shorter than when the distance is more than or equal to the threshold. If the area of the overlap between the region of the target object and the region of the specific object is more than or equal to a threshold, the association unit 308 may set the determination period at a period shorter than when the area of the overlap between the region of the target object and the region of the specific object is less than the threshold. The present processing is an example of the period change processing for changing the determination period.

In another example, the association unit 308 refers to a region included in at least either one of the regions of the target object and the specific object or a minimum circumscribed rectangle containing the regions of the target object and the specific object as a reference. The association unit 308 may then change the determination period to a shorter period if the ratio of the overlapping area of the region of the target object and the region of the specific object with respect to the area of the reference is high.

In a third modification, the association condition is not limited to that of the present exemplary embodiment described above. For example, the association unit 308 may associate a region of a specific object if a third condition is satisfied in addition to the foregoing first and second conditions. The third condition is that the amount of change in area (hereinafter, a maximum area change amount) of the region of the specific object with reference to the area of the region of the target object falls within a predetermined range. By the addition of the third condition, regions of specific objects that vary largely in area with respect to the region of the target object can be excluded from association candidates.

In the present exemplary embodiment, the distance between objects is defined according to the positions of the objects on the two-dimensional image. However, the method for calculating the distance is not limited thereto. In a fourth modification, for example, a sphere is assumed with the camera 101 at the center. An intersection of the sphere and a half line that starts at the camera 101 and connects the camera 101 with an object is defined as the coordinates of the object. The coordinates of an object are then uniquely determined by a longitude and a latitude. The longitude and the latitude of the object can be calculated from the orientation information about the imaging unit 204 during capturing of the video image and the information about the position of the object in the video image. In another example, the camera 101 may thus define the distance between objects based on the longitude and latitude, instead of the two-dimensional coordinates.

In a fifth modification, the determination unit 306 may change the region of the target object after the association in step S409. For example, the determination unit 306 may change the region of the target object so that the center of the region of the target object coincides with the center of the region of the associated specific object. Such processing is an example of region change processing for changing an object region of a target object.

In a sixth modification, the tracking processing may be performed by an apparatus other than the camera 101. For example, if there is a control apparatus of the camera 101 separate from the camera 101, the control apparatus may execute the tracking processing. In such a case, the control apparatus receives the video image captured by the camera 101 in real time, executes the tracking processing on the received video image, and transmits pan, tilt, and zoom control commands generated by the PTZ control to the camera 101. In another example, the recording apparatus 102 may perform the tracking processing. In such a case, the recording apparatus 102 may perform the tracking processing in real time on the video image received from the camera 101. The recording apparatus 102 may perform the tracking processing on a video image recorded in a not-illustrated storage unit. If the recording apparatus 102 performs the tracking processing, the PTZ control processing (step S412) may be omitted.

Up to this point, the prevent invention has been described in detail in conjunction with its exemplary embodiment. However, the present invention is not limited to such a specific exemplary embodiment, and various modes not departing from the gist of the invention are also embraced by the present invention. Some parts of the foregoing exemplary embodiment may be combined as appropriate.

The exemplary embodiment of the present invention has been described in detail above. However, examples of exemplary embodiments of the present invention may also include a system, an apparatus, a method, a program, and a recording medium (storage medium). Specifically, the exemplary embodiment of the present invention may be applied to a system including a plurality of devices (such as a host computer, an interface device, an imaging apparatus, and a web application). The exemplary embodiment of the present invention may be applied to an apparatus including a single device.

The exemplary embodiment of the present invention may be implemented by processing for supplying a program for implementing one or more of the functions of the foregoing exemplary embodiment to a system or an apparatus via a network or a storage medium, and reading and executing the program by one or more processors of a computer of the system or apparatus. The exemplary embodiment of the present invention may be implemented by a circuit (for example, an application specific integrated circuit (ASIC)) that implements one or more of the functions.

According to the foregoing exemplary embodiments, a plurality of objects in an image can be appropriately associated.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-104297, filed May 25, 2016, which is hereby incorporated by reference herein in its entirety.

What is claimed is:
1. A video processing apparatus comprising:
at least one processor; and
a memory that is coupled to the at least one processor and stores one or more computer-readable instructions, wherein the computer-readable instructions cause, when executed by the at least one processor, the at least one processor to operate to:
detect a position of a region of a tracking target included in a video image;

detect a position of a specific object included in the video image, the specific object having a predetermined feature; and in a case where a relative position of the specific object with reference to the position of the region of the tracking target satisfies a predetermined condition, associate the region of the tracking target with the specific object, wherein the predetermined condition includes that a distance between the position of the region of the tracking target and the position of the specific object in a same frame of the video image is less than a threshold, and wherein the at least one processor operates to, in a case where the region of the tracking target and the specific object are associated with each other by the at least one processor, track the tracking target by using at least either the detected position of the region of the tracking target or the detected position of the specific object.

2. The video processing apparatus according to claim 1, wherein the region of the tracking target is at least either a region of a moving object detected as the tracking target from the video image or a region specified as the tracking target by a user.

3. The video processing apparatus according to claim 1, the specific object is a region detected from the video image based on a feature unique to a specific object type.

4. The video processing apparatus according to claim 1, wherein the at least one processor operates to detect the position of the region of the tracking target based on a difference between a plurality of images captured at different times.

5. The video processing apparatus according to claim 1, wherein the at least one processor operates to determine the position of the region of the tracking target based on an operation by a user, and track the determined tracking target.

6. The video processing apparatus according to claim 1, wherein the at least one processor further operates to, in a case where the region of the tracking target and the specific object are associated with each other by the at least one processor, correct the position of the region of the tracking target based on the detected position of the specific object.

7. The video processing apparatus according to claim 1, further comprising:

at least one sensor that operates to capture the video image, wherein the at least one processor further operates to, in a case where the region of the tracking target and the specific object are associated with each other by the at least one processor, control at least either an imaging direction or an imaging angle of view of the at least one sensor by using at least either the detected position of the region of the tracking target or the detected position of the specific object.

8. The video processing apparatus according to claim 1, wherein the predetermined condition is that an amount of change in the relative position of the specific object with respect to the position of the region of the tracking target in each of a plurality of images corresponding to a predetermined determination period in the video image is less than a threshold.

9. The video processing apparatus according to claim 1, wherein the at least one processor operates to determine whether to associate the region of the tracking target with the specific object based on a condition concerning a relationship between an area of the region of the tracking target and an area of a region of the specific object.

10. The video processing apparatus according to claim 1, wherein the at least one processor operates to determine a condition for determining whether to associate the region of the tracking target with the specific object based on a number of specific objects detected in an image included in the video image, and determine whether to associate the region of the tracking target with the specific object according to the determined condition.

11. The video processing apparatus according to claim 1, wherein the at least one processor operates to determine whether to associate the region of the tracking target with the specific object based on a plurality of images corresponding to a predetermined determination period in the video image, and the at least one processor further operates to change the determination period based on at least either a distance between the position of the region of the tracking target and the position of the specific object or an area of an overlap between the region of the tracking target and a region of the specific object.

12. The video processing apparatus according to claim 1, wherein the at least one processor operates to determine whether to associate the region of the tracking target with the specific object based on a plurality of images corresponding to a predetermined determination period in the video image, and the at least one processor further operates to change the determination period based on the number of specific objects detected in an image included in the video image.

13. The video processing apparatus according to claim 1, wherein the specific object is a human head or a vehicle's license plate.

14. A video processing method comprising:

detecting a position of a region of a tracking target included in a video image;

detecting a position of a specific object included in the video image, the specific object having a predetermined feature; and associating, in a case where a relative position of the specific object with reference to the position of the region of the tracking target satisfies a predetermined condition, the region of the tracking target with the specific object based on a relative position between the detected position of the region of the tracking target and the detected position of the specific object, wherein the predetermined condition includes that a distance between the position of the region of the tracking target and the position of the specific object in a same frame of the video image is less than a threshold, and wherein the detecting of the position of the region of the tracking target includes, in a case where the region of the tracking target and the specific object are associated with each other, tracking the tracking target by using at least either the detected position of the region of the tracking target or the detected position of the specific object.

15. A non-transitory computer-readable storage medium storing at least one program for causing a computer to execute a method, the method comprising:

detecting a position of a region of a tracking target included in a video image;

detecting a position of a specific object included in the video image, the specific object having a predetermined feature; and in a case where a relative position of the specific object with reference to the position of the region of the tracking target satisfies a predetermined condition, associating the region of the tracking target with the specific object based on a relative position between the detected position of the region of the tracking target and the detected position of the specific object, wherein the predetermined condition includes that a distance between the position of the region of the tracking target and the position of the specific object in a same frame of the video image is less than a threshold, and wherein the detecting of the position of the region of the tracking target includes, in a case where the region of the tracking target and the specific object are associated with each other, tracking the tracking target by using at least either the detected position of the region of the tracking target or the detected position of the specific object.

16. The video processing apparatus according to claim 8, wherein the amount of change is a maximum change amount in the relative position of the specific object with respect to the position of the region of the tracking target in each of the plurality of images corresponding to the predetermined determination period.

\* \* \* \* \*